US009692715B2

(12) United States Patent
Krakirian et al.

(10) Patent No.: US 9,692,715 B2
(45) Date of Patent: Jun. 27, 2017

(54) MULTIPLE ETHERNET PORTS AND PORT TYPES USING A SHARED DATA PATH (71) Applicant: Cavium, Inc., San Jose, CA (US)

(72) Inventors: Shahe H. Krakirian, Palo Alto, CA (US); Paul G. Scrobohaci, Menlo Park, CA (US); Daniel A. Katz, Holliston, MA (US)

(73) Assignee: Cavium, Inc., San Jose, CA (US)

( * ) Notice: Subject to any disclaimer, the term of this patent is extended or adjusted under 35 U.S.C. 154(b) by 96 days.

(21) Appl. No.: 14/186,743

(22) Filed: Feb. 21, 2014

(65) Prior Publication Data
US 2015/0244649 A1 Aug. 27, 2015

(51) Int. Cl.
*H04L 12/935* (2013.01)
*H04L 1/00* (2006.01)
*H04L 12/933* (2013.01)

(52) U.S. Cl.
CPC .......... *H04L 49/30* (2013.01); *H04L 49/3063* (2013.01); *H04L 1/0052* (2013.01); *H04L 49/1546* (2013.01); *H04L 49/309* (2013.01); *H04L 49/3072* (2013.01)

(58) Field of Classification Search
CPC ... H04L 49/30; H04L 49/3063; H04L 49/103; H04L 49/3009; H04L 12/2424; H04L 41/0823; H04L 41/0803; H04L 45/74; H04L 45/64; H04L 69/22; H04L 61/2517; H04L 49/1546; H04L 49/00; H04L 2209/125
USPC .................................. 370/419, 429, 413, 329
See application file for complete search history.

(56) References Cited

U.S. PATENT DOCUMENTS

| | | | | |
|---|---|---|---|---|
| 5,909,686 A * | 6/1999 | Muller | .................. | H04L 49/254 |
| 6,731,652 B2 * | 5/2004 | Ramfelt | ................ | H04L 45/502 |
| | | | | 370/392 |
| 6,862,281 B1 * | 3/2005 | Chandrasekaran | . | H04L 45/7453 |
| | | | | 370/392 |
| 7,266,117 B1 * | 9/2007 | Davis | ............................ | 370/363 |
| 7,356,047 B1 * | 4/2008 | Mahalawat | ........... | H04J 3/0688 |
| | | | | 370/395.5 |
| 7,715,419 B2 * | 5/2010 | Tatar et al. | .................... | 370/419 |
| 7,835,380 B1 * | 11/2010 | Aloni | ................ | H04L 12/40032 |
| | | | | 370/394 |
| 7,933,268 B1 * | 4/2011 | Melman | .................. | H04L 12/18 |
| | | | | 370/245 |
| 9,049,113 B1 * | 6/2015 | Dropps | .................... | H04L 49/00 |
| 2002/0129307 A1 * | 9/2002 | Walker | .................... | H04L 1/242 |
| | | | | 714/715 |
| 2003/0187994 A1 * | 10/2003 | Jackson | .................. | H04L 29/06 |
| | | | | 709/227 |
| 2006/0050690 A1 * | 3/2006 | Epps et al. | ..................... | 370/359 |

(Continued)

FOREIGN PATENT DOCUMENTS

KR          10-0778346 B1    11/2007

*Primary Examiner* — Kwang B Yao
*Assistant Examiner* — Ricardo Castaneyra
(74) *Attorney, Agent, or Firm* — Hamilton, Brook, Smith & Reynolds, P.C.

(57) ABSTRACT

In an embodiment an interface unit includes a transmit pipeline configured to transmit egress data, and a receive pipeline configured to receive ingress data. At least one of the transmit pipeline and the receive pipeline being may be configured to provide shared resources to a plurality of ports. The shared resources may include at least one of a data path resource and a control logic resource.

24 Claims, 4 Drawing Sheets

(56) References Cited

U.S. PATENT DOCUMENTS

| | | | |
|---|---|---|---|
| 2006/0114906 A1* | 6/2006 | Bowes | H04L 49/3072 370/392 |
| 2006/0114914 A1 | 6/2006 | Anand et al. | |
| 2009/0080459 A1* | 3/2009 | Barkan | H04L 1/0002 370/463 |
| 2010/0153550 A1* | 6/2010 | Diab | G06F 21/85 709/225 |
| 2012/0236878 A1* | 9/2012 | Shafai | H04L 49/9068 370/474 |
| 2013/0138830 A1* | 5/2013 | Fang | H04L 47/263 709/233 |
| 2014/0006822 A1* | 1/2014 | Diab | G06F 1/3206 713/322 |

* cited by examiner

MULTIPLE ETHERNET PORTS AND PORT TYPES USING A SHARED DATA PATH

BACKGROUND

Ethernet includes a group of computer networking technologies that are used for local area networks (LANs). Given its high degree of compatibility, and its high data rates, Ethernet has become a commonly used computer networking technology. Typically, Ethernet port circuitry includes both media access control (MAC) and physical coding sublayer (PCS) circuitry.

Systems and devices typically connect to a network through one or more Ethernet ports. Traditionally, each individual Ethernet port is implemented with its own individual dedicated data path and control logic, especially for the MAC layer and PCS implementations.

SUMMARY

For Ethernet technologies, there is a need to reduce interconnect by reducing the number of ports, including input ports, output ports, bidirectional ports, and other types of ports. In order to compensate for limited input/output availability, Ethernet port implementations typically use one or more Serializer/Deserializer (SerDes) components. The present approach further reduces the number of inputs/outputs required in a given implementation by sharing data path and/or control logic for multiple ports.

There is also a need to improve cost and reduce integrated circuit area for Ethernet port implementations. There is a need in the industry to reduce and consolidate data path logic, and/or control logic. The present approach addresses these needs by sharing data path and control logic for multiple ports.

In one embodiment, an interface unit includes a transmit pipeline configured to transmit egress data, and a receive pipeline configured to receive ingress data. At least one of the transmit pipeline and the receive pipeline may be configured to provide shared resources to a plurality of ports. The shared resources may include a data path resource and/or a control logic resource.

In another embodiment, the interface unit may include at least one of the transmit pipeline and the receive pipeline being configured to provide shared resources using time division multiplexing (TDM). The shared resources may include at least one of: media access control (MAC) resources at a MAC layer and physical coding sublayer (PCS) resources at a PCS. The interface unit may further comprise a common media access control (MAC) resource unit.

In the interface unit, a portion of the transmit pipeline may comprise one or more pipeline stages that includes at least one of: data request, data buffering, credit management, insertion for physical coding sublayer (PCS) lane marker, length processing, pausing packet generation, pausing packet insertion, media independent interface (MII) signal generation, start of packet (SOP) conversion to a control character, end of packet (EOP) conversion to another control character, frame check sequence (FCS) generation, link layer processing, and interfacing to the physical coding sublayer (PCS). In the interface unit, a portion of the receive pipeline may comprise one or more pipeline stages that includes at least one of: realignment, protocol processing, link controller processing, frame processing, length processing, header processing, frame check sequence (FCS) verification, layer header extraction, data post-processing, error handling, and interfacing to the physical coding sublayer (PCS).

In the interface unit, a portion of the transmit pipeline may comprise one or more pipeline stages that includes at least one of: decoding, idle randomization, tag insertion, header insertion, character conversion, encoding, scrambling, test pattern generation, parity generation, alignment marker insertion, transcoding, auto-negotiation, lane steering, and interfacing to the media access control (MAC) layer. In the interface unit, a portion of the receive pipeline comprises one or more pipeline stages that includes at least one of: decoding, alignment marker locking, skew detection, deskew, reordering, parity checking, alignment marker removal, error rate monitoring, descrambling, test pattern checking, and interfacing to the media access control (MAC) layer.

In the interface unit, each port of the plurality of ports may comprise at least one of: a transmit port wherein the transmit pipeline is further configured to transmit the egress data using the transmit port, and a receive port wherein the receive pipeline is further configured to receive the ingress data using the receive port. In another embodiment, the interface unit ports of its plurality of ports may transmit or receive different protocols simultaneously. In the interface unit, each pipeline may be configured to provide the shared resources to some ports, but not all ports, of the plurality of ports.

In another embodiment, the present approach may include a method comprising: transmitting egress data through a transmit pipeline; receiving ingress data through a receive pipeline; and providing shared resources to a plurality of ports, by at least one of the transmit pipeline and the receive pipeline, the shared resources including at least one of: a data path resource and a control logic resource.

The method may include at least one of the transmit pipeline and the receive pipeline providing shared resources using time division multiplexing. The shared resources may include at least one of: media access control (MAC) resources at a MAC layer and physical coding sublayer (PCS) resources at a PCS. The shared resources may further include a common media access control (MAC) resource unit.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

An Ethernet port may include a media access control (MAC) layer and a physical layer. In one embodiment, the Ethernet protocol may be used as defined by the Institute of Electrical and Electronic Engineers (IEEE) 802.3 standard. Embodiments may support various data rates, including, but not limited to, data rates from 10 Mbps to 100 Gbps. Embodiments also may support various medium types for each speed. The MAC layer protocol is common for all speeds and types. The physical layer may include multiple sublayers, including, but not limited to, reconciliation, physical coding sublayer (PCS), forward error correct (FEC) sublayer, physical medium attachment (PMA) sublayer, physical medium dependent (PMD) sublayer and other sublayers. One or more protocols may be defined for each sublayer to support the various port speeds and medium types.

Figure 1:
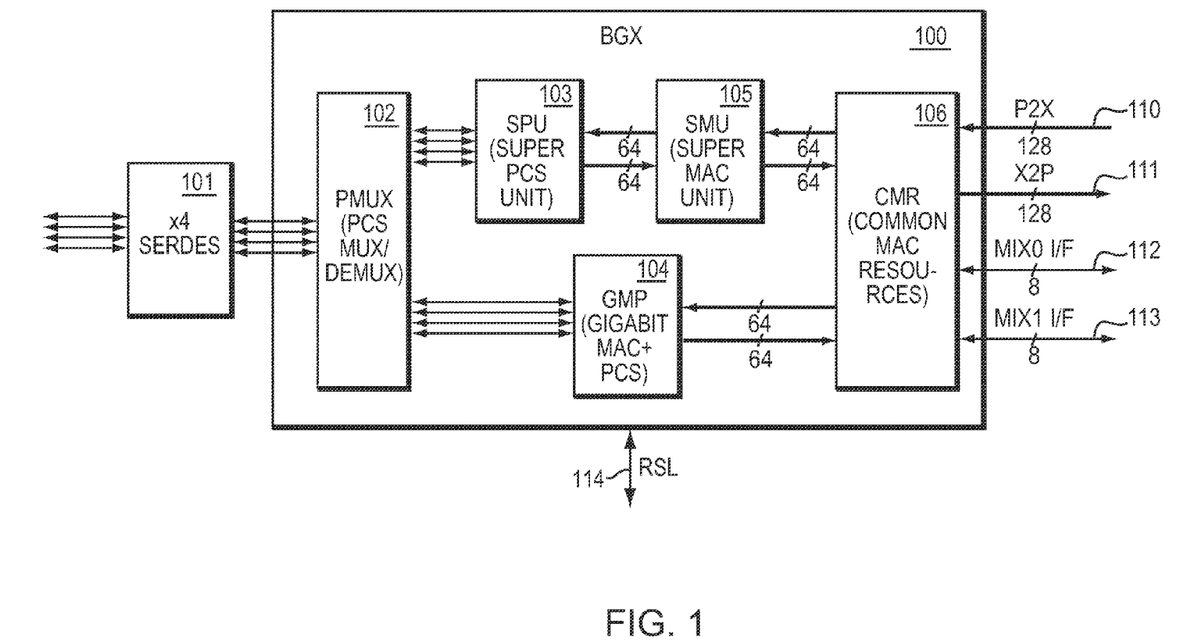
FIG. 1 illustrates an example embodiment of an interface unit that includes a set of Ethernet ports.

As illustrated in figures to follow, the interface unit 100 of FIG. 1 may comprise a transmit pipeline configured to transmit egress data, and a receive pipeline configured to receive ingress data. At least one of the transmit pipeline and the receive pipeline may be configured to provide shared resources to a plurality of ports. The shared resources may include at least one of: a data path resource and a control logic resource.

FIG. 1 illustrates an example embodiment of an interface unit (BGX) 100 that includes set of ports. As illustrated in FIG. 1, the embodiment may include one or more interfaces to a SerDes, as shown by the four-SerDes port block 101. The interface unit 100 may comprise an Ethernet input/output (I/O) interface block that supports one or more logical MACs (LMACs) with various link speeds. Various link speeds may include, but are not limited to, the range of 10 Mbps to 40 Gbps.

The BGX block 100 supports the MAC and PCS Layer functions of IEEE Standard 802.3 (including IEEE Standard 802.3ba), in addition to other features, and may reside between (QLM) Quad Lane Modules which may include one or more SerDes modules 101 on the PAD side and packet interfaces to other circuitry 110, 111, 112, 113, optionally including, but not limited, to interfaces to memory.

The Super MAC Unit (SMU) 105 may interface to the Super PCS Unit (SPU) 103 through an interface (including but not limited to a 40 Gigabit Media Independent Interface, also known as XLGMII), and to the Common MAC Resources (CMR) 106 through another interface. The SMU may support logical MAC (LMAC) contexts (one to four shown in the non-limiting example of FIG. 1), running concurrently in an interleaved or time-domain multiplexed (TDM) manner.

The Super PCS Unit (SPU) 103 sub-block provides the functionality of up to four Logical PCS (LPCS) contexts running, for non-limiting example, at rates of 10 Gbps and above. The SPU 103 interfaces to a SerDes 101 of one or more ports through the PCS Mux (PMUX) sub-block 102. The SPU 103 also interfaces to the Super MAC Unit (SMU) 105 sub-block through an interface, which may include, but is not limited to, a 40 Gigabit Media Independent Interface (XLGMII).

Alternatively, functionality of the PCS unit 103 and MAC unit 105 may be combined to form a Gigabit MAC plus PCS (GMP) unit 104, as illustrated in FIG. 1.

The interface unit 100 may include Common MAC Resources (CMR) 106. CMR may handle the common MAC resources for each interface of the interface unit. The common MAC resources may include, but are not limited to, TX/RX MAC buffers, statistics, destination MAC (DMAC) address filtering, and back-pressure/flow-control state. The CMR may interface to packet interfaces 110, 111, 112, 113.

The blocks within the BGX may include, but are not limited to, the SMU 105, SPU 103, GMP 104, PMUX 102, and CMR 106. Each block within the BGX may have its own Control/Status Register (CSR) block which may interface to other modules through the Register Slave Logic Module (RSL) Interface 114.

Embodiments may include shared resources including one or more MAC and/or physical layer (including PCS) resources. For example, some embodiments support a shared data path for four ports with a combined speed of 40 Gbps. Other embodiments may have more or less ports and a lower or higher speed.

Embodiments may support a variety of interface protocol types, including, but not limited to, the IEEE 802.3 Ethernet protocol type parameters. For example, data rates may include, but are not limited to, 10 Mbps, 100 Mbps, 1000 Mbps, 10 Gbps, 20 Gbps, 40 Gbps, and/or 100 Gbps. For example, modulation type may include, but is not limited to, Baseband modulation (BASE). For example, media and/or wavelength may include, but are not limited to, copper, extended reach, fiber, backplane, long reach, short reach, and/or twisted pair. For example, reach and/or PCS encoding may include, but are not limited to, scrambled encoding (64B66B), external sourced coding (4B5B, 8B10B), and/or energy efficient Ethernet. Ethernet protocols may optionally be multimode. The number of pairs and/or lanes may be 1, 4, 10, or other values. Some embodiments may support the extended attachment unit interface and/or XSBI Attachment Unit Interface (XAUI).

One embodiment may support at least the following list of MAC interface type protocols (and/or physical layer type protocols): 40 GBASE-R (40 Gbps Baseband-modulated scrambled coding), including but not limited to, 40 Gbps over 4 SerDes lanes; 10 GBASE-R, including, but not limited to, 10 Gbps over a single SerDes lane; DXAUI, including, but not limited to, 20 Gbps over 4 SerDes lanes; RXAUI, including, but not limited to, 10 Gbps over 2 SerDes lanes; 10 Gbps Baseband-modulated external sourced coding/extended attachment unit interface (10 GBASE-X/XAUI), including, but not limited to, 10 Gbps over 4 SerDes lanes; serial gigabit media independent interface/1000 Mbps Baseband-modulated external sourced coding (SGMII/1000 BASE-X), including, but not limited to, 1 Gbps over 1 SerDes lane; and other protocols at varying rates over varying numbers of SerDes lanes.

In the non-limiting example of FIG. 1, N-bit wide lines (64-bit wide lanes in FIG. 1) may share multiple N-bit messages which are time-division multiplexed. Through time-division multiplexing (TDM), data information and/or control information from multiple ports may be transmitted together, on a given N-bit port lane. The sharing of port information through TDM may be implemented either through a round-robin scheme, or through any other TDM time-sharing scheme. TDM may be implemented in the SPU 103, SMU 105, GMP 104, CMR 106, and in other logic blocks within, or connected to, the BGX.

Using TDM, in order to support four ports, the interface unit of FIG. 1 merely requires one N-bit (64-bit in FIG. 1) interface in each direction (transmit and receive). Similarly, the interface between SPU 103 and SMU 105 merely requires one interface in each direction, as does the interface between SMU 105 and CMR 106, and the interface between GMP 104 and CMR 106. Note, by contrast, existing interfaces require four N-bit interfaces in order to support four ports. Therefore, in the non-limiting four port example, this may result in four times less interconnect compared with existing approaches.

Note, each port illustrated in FIG. 1 may utilize a different protocol type from each other port in FIG. 1. Alternatively, all ports in FIG. 1 may use the same protocol type. In yet another embodiment, some ports in FIG. 1 may use the same protocol type, and other ports in FIG. 1 may use different protocol types.

Figure 2:
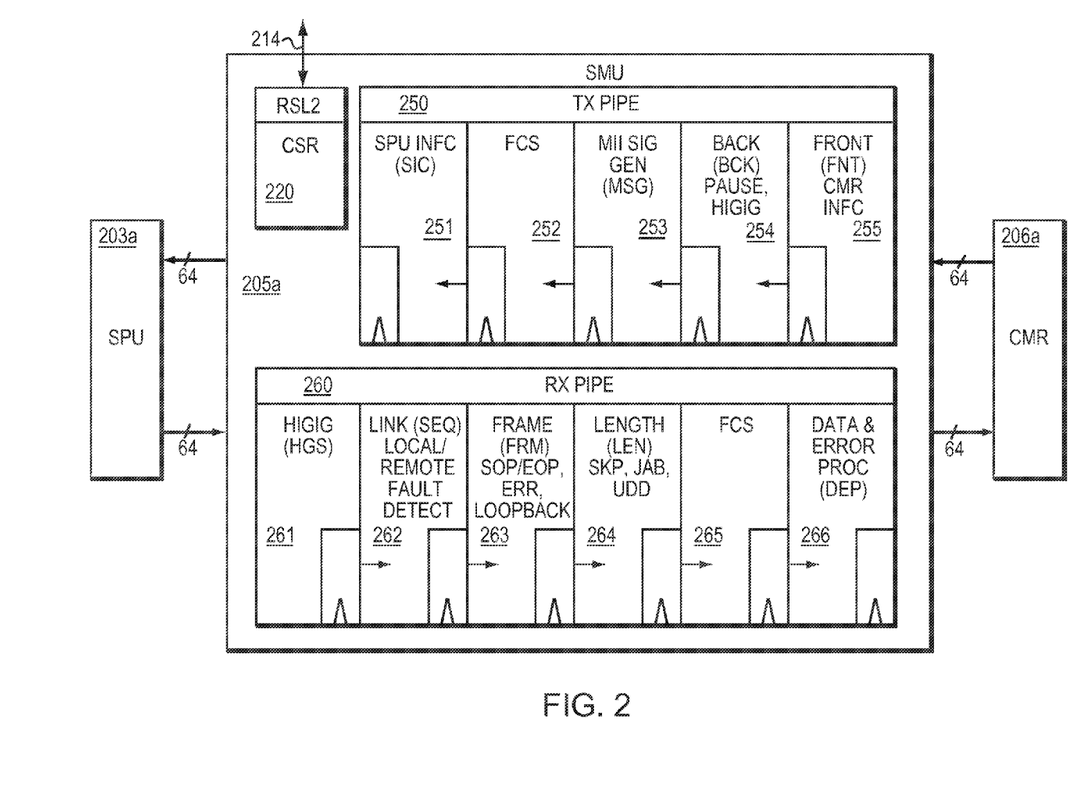
FIG. 2 illustrates an example embodiment of a MAC interface unit, and its associated pipelines, associated with FIG. 1.

The SMU 105 of FIG. 1 is illustrated in FIG. 2 in more detail. FIG. 2 illustrates an example embodiment of a MAC interface unit 205a, also known as an SMU, and its associated pipelines 250, 260. As illustrated in FIG. 2, the MAC interface unit 205a includes a transmit pipeline 250 configured to receive egress data from the CMR 206a, modify the egress data, and transmit the egress data to the SPU 203a. The MAC interface unit 205a also includes a receive pipeline 260 configured to receive ingress data from the SPU 203a, modify the ingress data, and transmit the ingress data to the CMR 206a.

At least one of the transmit pipeline 250 and the receive pipeline 260 may be configured to provide shared resources to a plurality of ports. The shared pipeline resources illustrated in FIG. 2 may include data path resources and/or control logic resources. Configuration/Status Registers 220 and memory resources may also be shared between pipelines, and may communicate with other modules through the RSL interface 214.

Existing approaches require a separate pipeline for each individual port. By contrast with existing approaches, the present approach may share one pipeline among two or more ports, thereby saving resources. As illustrated in the non-limiting four port example, in FIG. 2, the TX pipeline 250 (and/or RX pipeline 260) may be shared across data paths for all four ports (or alternatively, pipelines may be shared across some ports and not other ports), thereby significantly reducing the amount of data path logic required, compared with existing approaches that would require a separate pipeline for each port. Similarly to data path logic, control logic, including but not limited to memory and control registers 220, may also be shared across multiple ports, thereby further reducing required logic resources.

In one embodiment, the receive pipeline 260 may include a set of pipeline stages that includes at least one of the following stages: realignment, protocol processing, link controller processing, frame processing, length processing, header processing, frame check sequence (FCS) verification, layer header extraction, data post-processing, error handling, and interfacing to the physical coding sublayer (PCS), although not necessarily in that order.

In one embodiment, the SMU RX pipeline 260 may distribute its workload among its pipe stages and perform at least one or more of the following functions, although not necessarily in the following order:

1. Re-alignment to lane 0 (ALN stage), included in pipeline stage 261 in FIG. 2. For design simplicity, the HIGIG2, link and frame state machines may expect control characters to appear in accordance with the 802.3ba 40 Gbps MAC specification. However, the 10 Gbps MAC may specify the Extended Gigabit Media Independent Interface (XGMII) on fewer lanes, as a result of which aforementioned control characters may be realigned.

2. HIGIG and/or HIGIG2 processing (HGS stage), also included in pipeline stage 261 in FIG. 2. This stage may include, but is not limited to, detection of a KSOM character, extraction of HIGIG2 PAUSE and XOF information, HIGIG2 cyclic redundancy check (CRC) calculation, and error generation, and HIGIG2 header checking and error generation. This stage may also include writing of the above data to CSR 220 and TX block 250, and filtering of the HIGIG2 header before piping to next stage.

3. Link controller (SEQ stage), as shown by pipeline stage 262 in FIG. 2. This stage may include, but is not limited to, local and remote error sequence detection, counting, filtering, and fault notification to CSR 220.

4. Frame processor (FRM stage), as shown by pipeline stage 263 in FIG. 2. This stage may include, but is not limited to, a state machine, data-path processing control characters, forming end of packet (EOP), start of packet (SOP), and/or delimited packets. This stage may also detect unexpected or erroneous control sequences and notify the CSR sub-block 220 and CMR block 206a accordingly.

5. Length and header processing (LEN/LHE stage), as shown by pipeline stage 264 in FIG. 2. This stage may include, but is not limited to, counting packet byte-length, performing comparisons to CSR-based thresholds, and notifying the CSR 220 accordingly. This stage may also include, but is not limited to, pre-processing payload for CRC calculation by computing its modulo-8 byte shift, generating an appropriate mask, L2 header extraction, and data loop-back to the SMU TX pipeline 250.

6. FCS calculation and L2 header extraction (FCS/LHE stage), as shown by pipeline stage 265 in FIG. 2. This stage may include, but is not limited to, calculating and verifying FCS/CRC, and generating errors accordingly. This stage may include, but is not limited to, identifying multicast/targeted PAUSE, PFC XON/XOFF/PAUSE, DMAC address data and writing them to the CSR 220 and/or TX pipeline 250 and generating hints for filtering by the CMR 206a (for non-limiting example, indicating which packets are control packets as soon as the information becomes available and sending it down the pipeline with the rest of the data and controls).

7. Data post-processing and error encoding (DEP), as shown by pipeline stage 266 in FIG. 2. This stage may include, but is not limited to, encoding errors onto an error bus that are directly reported to the CMR 206a, and data order may be flipped from arrival order.

In one embodiment, the transmit pipeline 250 may include a set of pipeline stages that includes at least one of the following stages: data request, data buffering, credit management, insertion for physical coding sublayer (PCS) lane marker, length processing, pausing packet generation, pausing packet insertion, media independent interface (MII) signal generation, start of packet (SOP) conversion to a control character, end of packet (EOP) conversion to another control character, frame check sequence (FCS) generation, link layer processing, and interfacing to the physical coding sublayer (PCS), although not necessarily in that order.

In one embodiment, the SMU TX pipeline 250 may distribute its workload among its pipe stages and perform at least one or more of the following functions, although not necessarily in the following order:

1. Pipeline stage 255 in FIG. 2 may include, but is not limited to, data requesting to CMR, data buffering, SPU credit management, bubble insertion for PCS lane marker.

2. Pipeline stage 254 in FIG. 2 may include, but is not limited to, length processing, pause packet generation and insertion.

3. Pipeline stage 253 in FIG. 2 may include, but is not limited to, Media Independent Interface (MII) signal generation, and SOP/EOP to control character conversion.

4. Pipeline stage 252 in FIG. 2 may include, but is not limited to, FCS generation.

5. Pipeline stage 251 in FIG. 2 may include, but is not limited to, link layer processing and interfacing to SPU 203*a*.

Figure 3:
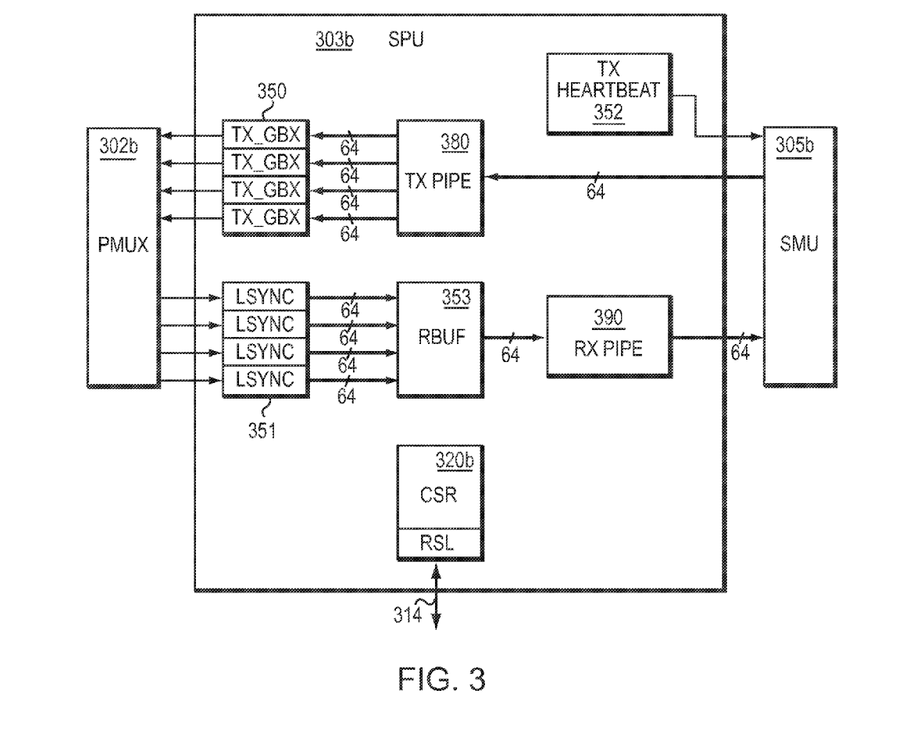
FIG. 3 illustrates an example embodiment of a PCS interface unit associated with FIG. 1.

In addition to the MAC layer interface unit of FIG. 2, FIG. 3 illustrates an example embodiment of a physical layer interface unit within the set of Ethernet ports of FIG. 1. As illustrated in FIG. 3, the physical coding sublayer (PCS) interface unit 303*b* (also known as the SPU) includes a transmit pipeline 380 configured to receive egress data from the SMU 305*b*, modify the egress data, and transmit the egress data to the Transmit Gearbox (TX_GBX) 350. The TX_GBX 350 performs data width translation on the egress data. The TX_GBX 350 transmits the egress data from the TX Pipe 380 to a multiplexer (PMUX) 302*b*.

The SPU 303*b* receives ingress data from the PMUX 302*b*, synchronizes the ingress data to 8B10B or 64B66B code boundaries through the lane synchronization module (LSYNC) 351, and forwards the ingress data to a receive buffer (RBUF) 353. The SPU 303*b* also includes a receive pipeline 390 configured to receive ingress data from the RBUF 353, modify the ingress data, and transmit the ingress data to the SMU 305*b*.

The transmit pipeline 380 and/or the receive pipeline 390 may be configured to provide shared resources to a plurality of ports. The shared pipeline resources illustrated in FIG. 3 may include data path resources and/or control logic resources. Configuration/Status Registers 320*b* and memory resources may also be shared between ports, and may communicate with other modules through the RSL interface 314. In addition, the SPU 303*b* may include a transmit heartbeat controller module (TX Heartbeat) 352 which manages credit based flow control to the SMU 305*b* in order to maintain the proper transmit data rate.

Figure 4:
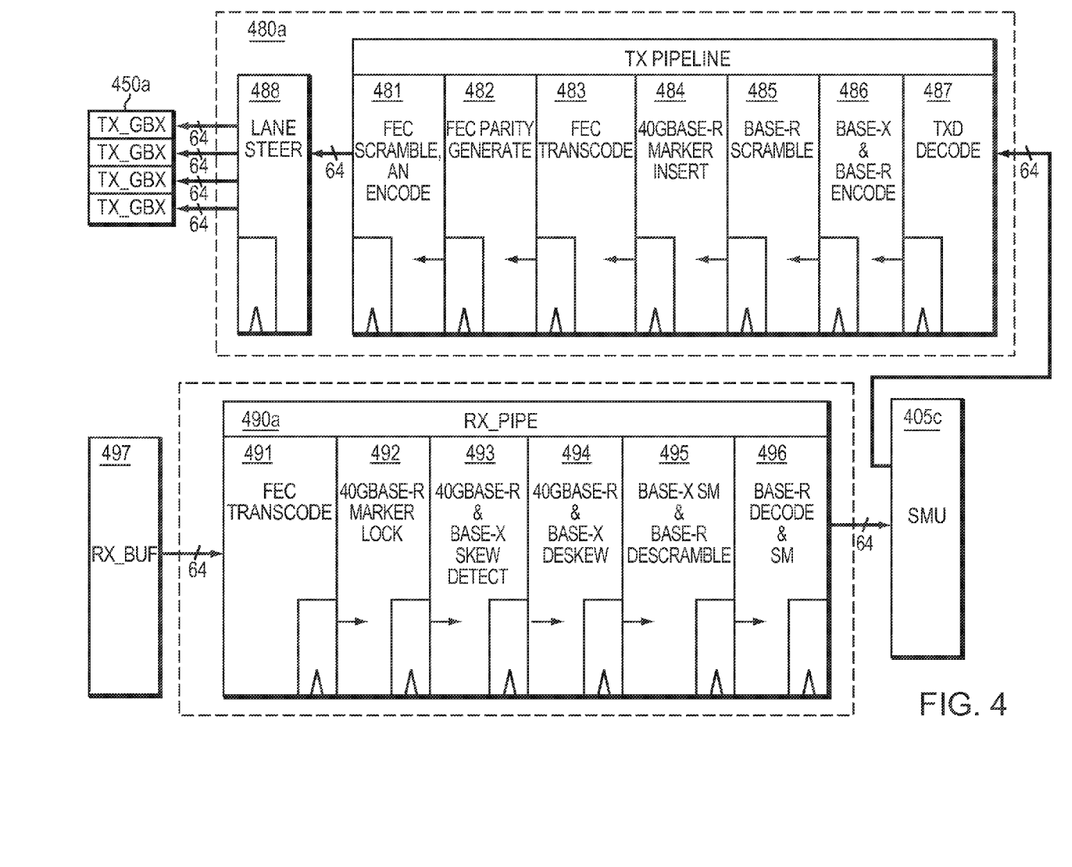
FIG. 4 illustrates transmit and receive pipelines that are associated with the PCS interface unit of FIG. 3.

FIG. 4 illustrates transmit and receive pipelines that are associated with the PCS interface unit (SPU) of FIG. 3. As illustrated in FIG. 4, the physical coding sublayer (PCS) interface unit (also known as the SPU) includes a transmit pipeline 480*a* configured to receive egress data from the SMU 405*c*, modify the egress data, and transmit the egress data to the Transmit Gearbox (TX_GBX) 450*a*. The TX_GBX 450*a* performs data width translation on the egress data. In addition, the SPU may include a receive pipeline 490*a* configured to receive ingress data from the RBUF 497, modify the ingress data, and transmit the ingress data to the SMU 405*c*.

At least one of the transmit pipeline 480*a* and the receive pipeline 490*a* are configured to provide shared resources to a plurality of ports. The shared pipeline resources illustrated in FIG. 4 may include data path resources and/or control logic resources. Configuration/Status Registers and memory resources may also be shared between pipelines.

Existing approaches require a separate pipeline for each port. By contrast with existing approaches, the present approach may share one pipeline for each port. As illustrated in the non-limiting four port example, in FIG. 4, the TX pipeline 480*a* (and/or RX pipeline 490*a*) may be shared across data paths for all four ports, thereby significantly reducing the amount of data path logic required, compared with existing approaches that would require a separate pipeline for each port. Similarly to data path logic, control logic, including but not limited to memory and control registers, may also be shared across multiple ports, thereby further reducing required logic resources.

In one embodiment, each transmit pipeline 480*a* may include a set of pipeline stages that includes at least one of the following stages: decoding, idle randomization, tag insertion, header insertion, character conversion, encoding, scrambling, test pattern generation, parity generation, alignment marker insertion, transcoding, auto-negotiation, lane steering, and interfacing to the media access control (MAC) layer, although not necessarily in that order.

In one embodiment, the SPU TX pipeline 480*a* may distribute its workload among its pipe stages and perform at least one or more of the following functions, although not necessarily in the following order:

1. Decode XLGMII data from SMU. See the TXD Decode pipe stage 487 in FIG. 4.

2. BASE-X PCS Transmit Source state diagram (idle randomization and Q insertion) specified in IEEE 802.3. See the 'BASE-X & BASE-R Encode' pipe stage 486 in FIG. 4. Note that conversion of XGMII characters (8-bit data octet plus control bit) into 10-bit code-groups may be performed.

3. BASE-R 64B66B Transmit state diagram (i.e. encoder), as specified in IEEE 802.3. See the 'BASE-X & BASE-R Encode' pipe stage 486 in FIG. 4.

4. BASE-R scrambler specified in IEEE 802.3. See the BASE-R Scramble pipe stage 485 in FIG. 4.

5. BASE-R test pattern generation, as specified in IEEE 802.3. See the BASE-R Scramble pipe stage 485 in FIG. 4.

6. 40 GBASE-R alignment marker insertion and Bit Interleaved Parity generation, as specified in IEEE 802.3ba. See 40 GBASE-R Marker Insert pipe stage 484 in FIG. 4. Note, round robin PCS lane assignment may be performed by the SMU, the SPU, or both the SMU and SPU.

7. Optional encoding of BASE-R Forward Error Correction (FEC), as shown in pipe stage 483 in FIG. 4. The TX pipeline 480*a* includes the transcode encoder (FEC Transcode pipe stage 483), parity generator (FEC Parity Generate pipe stage 482), and scrambler (FEC Scramble and AN Encode pipe stage 481), as specified in IEEE 802.3.

8. The Transmit state diagram for optional auto-negotiation, as specified in IEEE 802.3, which may be executed on a (logical) PCS lane of the associated logical PCS (LPCS). See the FEC Scramble and AN Encode pipe stage 481.

9. Lane steering, as shown in FIG. 4 pipe stage 488. A valid beat at the output stage of the TX_PIPE is steered to the associated TX_GBX module(s) 450*a*. For BASE-R, a valid beat may include, but is not limited to, data for one 66-bit block to be transmitted on a given SerDes lane, so the entire block may be steered to the associated TX_GBX module. For BASE-X, a valid beat may include data for two 4-octet columns that are distributed among the 4 SerDes lanes (or associated 2 SerDes lanes for RXAUI).

As illustrated in FIG. 4, the SPU also uses a receive pipeline 490*a*. Each receive pipeline may comprise a set of pipeline stages that includes at least one of the following stages: decoding, alignment marker locking, skew detection, deskew, reordering, parity checking, alignment marker removal, error rate monitoring, descrambling, test pattern checking, and interfacing to the media access control (MAC) layer, although not necessarily in that order.

In one embodiment, the SPU RX pipeline 490*a* may distribute its workload among its pipe stages and perform at least one or more of the following functions, although not necessarily in the following order:

1. FEC transcode decode, as specified in IEEE 802.3. See the FEC Transcode pipe stage 491 in FIG. 4.

2. 40 GBASE-R alignment marker lock, as specified in IEEE 802.3ba. See the 40 GBASE-R Marker Lock pipe stage 492 in FIG. 4.

3. Lane-to-lane skew detection for downstream BASE-X and 40 GBASE-R deskew functions. See 40 GBASE-R and BASE-X Skew Detect pipe stage 493 in FIG. 4.

4. BASE-X PCS Deskew state diagram specified in IEEE 802.3. See the 40 GBASE-R and BASE-X Deskew pipe stage 494 in FIG. 4.

5. 40 GBASE-R PCS lane deskew, lane reorder, Bit Interleaved Parity checking and alignment marker removal, as specified in 802.3ba. See the 40 GBASE-R and BASE-X Deskew pipe stage 494 in FIG. 4.

6. BASE-X PCS receive state diagram specified in IEEE 802.3. See the BASE-X SM and BASE-R Descramble pipe stage 495 in FIG. 4.

7. BASE-R bit error rate monitor as specified in IEEE 802.3. See the BASE-X SM and BASE-R Descramble pipe stage 495 in FIG. 4.

8. BASE-R descrambler specified in IEEE 802.3. See the BASE-X SM and BASE-R Descramble pipe stage 495 in FIG. 4.

9. BASE-R 64B66B Receive state diagram (i.e. decoder), as specified in IEEE 802.3 and IEEE 802.3ba. See the BASE-R Decode and SM pipe stage 496 in FIG. 4.

10. 40 GBASE-R scrambled idle test pattern checker, as specified in 802.3ba. See the BASE-R Decode & SM pipe stage 496 in FIG. 4.

The present approach has multiple advantages. The shared data path and/or shared control logic may reduce integrated circuit area (such as silicon area). In addition, the present approach includes at least the following advantages:

a) Avoiding replication of hardware resources for multiple ports. For example, an implementation of multiple 10 GBASE-R ports may use a single 64B/66B encoder and scrambler on the transmit path and a single 64B/66B descrambler and decoder on the receive path, rather than replicating them for each port.

b) Optimizing a shared data path for the maximum combined speed of all ports using it. For example, a single data path supporting a data rate of up to 40 Gbps may be configured to run as a single 40 GBASE-R port or four 10 GBASE-R ports, where either configuration connects to four SerDes lanes. Without the shared data path of the present approach, at least three additional 10 Gbps data paths may be needed to support the four 10 GBASE-R ports.

c) Avoiding replication of data path resources (i.e. pipeline stages and buffer memory) for different port types. For example, a single data path supporting 40 GBASE-R or XAUI may share the same buffer memory needed to deskew data received on the four SerDes lanes.

Note that the pipelines described herein, including but not limited to, pipelines 250, 260, 380, 390, 480a, 490a, may be considered as portions of one or more pipelines. For example, the SMU transmit pipeline 250 and the SPU transmit pipeline 480a may be considered as portions of a single transmit pipeline. For example, the SMU receive pipeline 260 and the SPU receive pipeline 490a may be considered as portions of a single receive pipeline.

Note that one of ordinary skill in the art appreciates that additional inputs/outputs, and other circuit elements, may be added or removed from the interface units/circuits described herein, in order to modify the interface unit functionality (data, clocks, or other circuitry) as needed for a given application. Therefore, the present approach is not limited to the exact interface units and/or circuits shown herein and may be extended, while still relying upon the concepts of the present approach.

The present approach may be applied to any type of Ethernet port and/or interface unit, including, but not limited to, implementations including electronic circuits, semiconductors, integrated circuits, Very Large Scale Integrated Circuits (VLSI ICs), Complementary Metal-Oxide-Semiconductors (CMOS), Application Specific Integrated Circuits (ASICs), circuitry on printed circuit boards (PCBs), microprocessors (also known as "processors"), nanotechnology circuits, and other types of circuits.

While this invention has been particularly shown and described with references to example embodiments thereof, it will be understood by those skilled in the art that various changes in form and details may be made therein without departing from the scope of the invention encompassed by the appended claims.

What is claimed is:

1. An interface unit comprising:
a transmit pipeline configured to transmit egress data, and
a receive pipeline configured to receive ingress data,
at least one of the transmit pipeline and the receive pipeline being configured to provide shared resources to a plurality of ports, the shared resources including media access control (MAC) resources at a MAC layer and physical coding sublayer (PCS) resources at a PCS,
wherein the shared resources include a data path resource and a control logic resource and at least one of the transmit pipeline and the receive pipeline are configured to provide shared resources using time division multiplexing;
wherein a portion of the transmit pipeline comprises a plurality of pipeline stages that includes interfacing to the MAC layer, decoding media independent interface data from the MAC layer, tag insertion, header insertion, character conversion, encoding, scrambling including test pattern generation, auto-negotiation, and at least one of: bit interleaved parity generation, alignment marker insertion, transcoding including parity generation and scrambling, lane steering, and idle randomization including conversion of one or more media independent interface characters into code-groups, and
wherein the PCS resources include a transmit heartbeat controller module which manages flow control to the MAC resources in order to maintain a transmit data rate of the data path resource.

2. The interface unit of claim 1, wherein the interface unit further comprises a common media access control (MAC) resource unit.

3. The interface unit of claim 1, wherein the portion of the transmit pipeline comprises the plurality of pipeline stages that includes insertion for physical coding sublayer (PCS) lane marker, interfacing to the physical coding sublayer (PCS), data request, data buffering, pausing packet generation, pausing packet insertion, and at least one of: credit management length processing, media independent interface (MiI) signal generation, start of packet (SOP) conversion to a control character, end of packet (EOP) conversion to another control character, frame check sequence (FCS) generation, and link layer processing.

4. The interface unit of claim 3, wherein the portion of the transmit pipeline that comprises the plurality of pipeline stages that includes the insertion for physical coding sublayer (PCS) lane marker, the interfacing to the physical coding sublayer (PCS) the data request, the data buffering, the pausing packet generation, the pausing packet insertion, the credit management, the length processing, the media independent interface (MII) signal generation, the start of packet (SOP) conversion to a control character, the end of packet (EOP) conversion to another control character, the frame check sequence (FCS) generation, and the link layer processing.

5. The interface unit of claim 1, wherein a portion of the receive pipeline comprises a plurality of pipeline stages that includes interfacing to the physical coding sublayer (PCS) protocol processing, header processing, layer header extraction, frame check sequence (FCS) verification, error handling, and at least one of: realignment, link controller processing, frame processing, length processing, and data post-processing.

6. The interface unit of claim 5, wherein the portion of the receive pipeline that comprises the plurality of the pipeline stages that includes the interfacing to the physical coding sublayer (PCS) the protocol processing, the header processing, the layer header extraction, the frame check sequence (FCS) verification, the error handling, the frame processing, and at least one of: the realignment, the link controller processing, the length processing, and the data post-processing.

7. The interface unit of claim 5, wherein the portion of the receive pipeline that comprises the plurality of the pipeline stages that includes the interfacing to the physical coding sublayer (PCS) the protocol processing, the header processing, the layer header extraction, the frame check sequence (FCS) verification, the error handling, the frame processing, the length processing, and at least one of: the realignment, the link controller processing, and the data post-processing.

8. The interface unit of claim 5, wherein the portion of the receive pipeline that comprises the plurality of the pipeline stages that includes the interfacing to the physical coding sublayer (PCS) the protocol processing, the header processing, the layer header extraction, the frame check sequence (FCS) verification, the error handling, the frame processing, the length processing, the realignment, and at least one of: the link controller processing, and the data post-processing.

9. The interface unit of claim 5, wherein the portion of the receive pipeline that comprises the plurality of the pipeline stages that includes the interfacing to the physical coding sublayer (PCS) the protocol processing, the header processing, the layer header extraction, the frame check sequence (FCS) verification, the error handling, the frame processing, the length processing, the realignment, the link controller processing, and the data post-processing.

10. The interface unit of claim 1, wherein a portion of the receive pipeline comprises a plurality of pipeline stages that includes interfacing to the media access control (MAC) layer, decoding, and at least one of: alignment marker locking, skew detection, deskew, reordering, parity checking, alignment marker removal, error rate monitoring, descrambling, and test pattern checking.

11. The interface unit of claim 10, wherein the portion of the receive pipeline that comprises the plurality of pipeline stages that includes interfacing to the media access control (MAC) layer decoding, the alignment marker locking, the skew detection, the deskew, the reordering, the parity checking, the alignment marker removal, the error rate monitoring, the descrambling, and the test pattern checking.

12. The interface unit of claim 1, wherein each port of the plurality of ports comprises at least one of: a transmit port wherein the transmit pipeline is further configured to transmit the egress data using the transmit port, and a receive port wherein the receive pipeline is further configured to receive the ingress data using the receive port.

13. The interface unit of claim 1, wherein each pipeline is configured to provide the shared resources to some ports, but not all ports, of the plurality of ports.

14. The interface unit of claim 1, wherein the portion of the transmit pipeline that comprises the plurality of the pipeline stages that includes the interfacing to the MAC layer, the decoding media independent interface data from the MAC layer, the tag insertion, the header insertion, the character conversion, the encoding, the scrambling including test pattern generation, the auto-negotiation, the lane steering, and at least one of: the bit interleaved parity generation, the alignment marker insertion, the transcoding including parity generation and scrambling, and the idle randomization including conversion of one or more media independent interface characters into code-groups.

15. The interface unit of claim 1, wherein the portion of the transmit pipeline that comprises the plurality of the pipeline stages that includes the interfacing to the MAC layer, the decoding media independent interface data from the MAC layer, the tag insertion, the header insertion, the character conversion, the encoding, the scrambling including test pattern generation, the auto-negotiation, the lane steering, the transcoding including parity generation and scrambling, and at least one of: the bit interleaved parity generation, the alignment marker insertion, and the idle randomization including conversion of one or more media independent interface characters into code-groups.

16. The interface unit of claim 1, wherein the portion of the transmit pipeline that comprises the plurality of the pipeline stages that includes the interfacing to the MAC layer, the decoding media independent interface data from the MAC layer, the tag insertion, the header insertion, the character conversion, the encoding, the scrambling including test pattern generation, the auto-negotiation, the lane steering, the transcoding including parity generation and scrambling, the alignment marker insertion, and at least one of: the bit interleaved parity generation, and the idle randomization including conversion of one or more media independent interface characters into code-groups.

17. The interface unit of claim 1, wherein the portion of the transmit pipeline that comprises the plurality of the pipeline stages that includes the interfacing to the MAC layer, the decoding media independent interface data from the MAC layer, the tag insertion, the header insertion, the character conversion, the encoding, the scrambling including test pattern generation, the auto-negotiation, the lane steering, the transcoding including parity generation and scrambling, the alignment marker insertion, the bit interleaved parity generation, and the idle randomization including conversion of one or more media independent interface characters into code-groups.

18. A method comprising:
transmitting egress data through a transmit pipeline;
receiving ingress data through a receive pipeline; and
providing shared resources to a plurality of ports, by at least one of the transmit pipeline and the receive pipeline, the shared resources including media access control (MAC) resources at a MAC layer and physical coding sublayer (PCS) resources at a PCS,
wherein the shared resources include a data path resource and a control logic resource and at least one of the transmit pipeline and the receive pipeline are configured to provide shared resources using time division multiplexing,
wherein a portion of the transmit pipeline comprises a plurality of pipeline stages that includes interfacing to the MAC layer, decoding media independent interface data from the MAC layer, tag insertion, header insertion, character conversion, encoding, scrambling including test pattern generation, auto-negotiation, and at least one of: bit interleaved parity generation, alignment marker insertion, transcoding including parity generation and scrambling, lane steering, and idle randomization including conversion of one or more media independent interface characters into code-groups, and wherein the PCS resources include a transmit heartbeat controller module which manages flow control to the MAC resources in order to maintain a transmit data rate of the data path resource.

19. The method of claim 18, wherein the shared resources further include a common media access control (MAC) resource unit.

20. The method of claim 18, wherein the portion of the transmit pipeline comprises the plurality of pipeline stages that includes insertion for physical coding sublayer (PCS) lane marker, interfacing to the physical coding sublayer (PCS), data request, data buffering, pausing packet generation, pausing packet insertion, and at least one of: credit management length processing, media independent interface (MiI) signal generation, start of packet (SOP) conversion to a control character, and of packet (EOP) conversion to another control character, frame check sequence (FCS) generation, and link layer processing.

21. The method of claim 18, wherein a portion of the receive pipeline comprises a plurality of pipeline stages that includes interfacing to the physical coding sublayer (PCS) protocol processing, header processing, layer header extraction, frame check sequence (FCS) verification, error handling, and at least one of: realignment, link controller processing, frame processing, length processing, and data post-processing.

22. The method of claim 18, wherein a portion of the receive pipeline comprises a plurality of pipeline stages that includes interfacing to the media access control (MAC) layer, decoding, and at least one of: alignment marker locking, skew detection, deskew, reordering, parity checking, alignment marker removal, error rate monitoring, descrambling, and test pattern checking.

23. The method of claim 18, wherein each port of the plurality of ports comprises at least one of: a transmit port wherein the transmit pipeline transmits the egress data using the transmit port, and a receive port wherein the receive pipeline receives the ingress data using the receive port.

24. The method of claim 18, wherein each pipeline provides the shared resources to some ports, but not all ports, of the plurality of ports.

* * * * *

UNITED STATES PATENT AND TRADEMARK OFFICE
CERTIFICATE OF CORRECTION

PATENT NO.           : 9,692,715 B2
APPLICATION NO.      : 14/186743
DATED                : June 27, 2017
INVENTOR(S)          : Shahe H. Krakirian et al.

It is certified that error appears in the above-identified patent and that said Letters Patent is hereby corrected as shown below:

In the Claims

In Column 10, Line 52, Claim 3, delete "(MiI)" and insert -- (MII) --;

In Column 11, Line 1, Claim 5, delete "a" before "portion" and insert -- the --;

In Column 11, Line 2, Claim 5, delete "a" before "plurality" and insert -- the --;

In Column 13, Line 17, Claim 20, delete "(MiI)" and insert -- (MII) --;

In Column 13, Line 18, Claim 20, delete "and" before "of packet" and insert -- end --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*